(12) United States Patent
Yanagisawa et al.

(10) Patent No.: US 6,167,749 B1
(45) Date of Patent: Jan. 2, 2001

(54) METHOD AND APPARATUS FOR AUTOMATICALLY DETECTING GAS LEAK, AND RECORDING MEDIUM FOR LEAK DETECTION

(75) Inventors: Takahiro Yanagisawa; Naoshi Hirota, both of Hamamatsu (JP)

(73) Assignee: Yamaha Corporation, Tokyo (JP)

( * ) Notice: Under 35 U.S.C. 154(b), the term of this patent shall be extended for 0 days.

(21) Appl. No.: 09/152,971

(22) Filed: Sep. 14, 1998

(30) Foreign Application Priority Data

Sep. 17, 1997 (JP) .................................................. 9-270648

(51) Int. Cl.$^7$ ............................. G01M 3/32; G01M 3/26; F17D 3/00; G01N 27/04
(52) U.S. Cl. ............................. 73/40.5 R; 73/49.6; 73/40
(58) Field of Search ................................... 73/40, 40.5 R, 73/49.2, 49.1, 52, 37, 49.6

(56) References Cited

U.S. PATENT DOCUMENTS

| | | | |
|---|---|---|---|
| 3,756,072 | * 9/1973 | MacMurray | 73/40.5 |
| 4,710,206 | * 12/1987 | Allen et al. | 55/58 |
| 4,905,501 | * 3/1990 | Sawatani | 73/40 |
| 5,081,864 | * 1/1992 | Zaim | 73/49.2 |
| 5,214,957 | * 6/1993 | Collins | 73/40 |
| 5,367,797 | * 11/1994 | Zaim | 73/49.2 |
| 5,448,907 | * 9/1995 | Jensen et al. | 73/38 |
| 5,546,789 | * 8/1996 | Balke | 73/40 |
| 5,596,137 | * 1/1997 | Perry et al. | 73/49.2 |
| 5,610,324 | * 3/1997 | Lawson | 73/46 |
| 5,668,534 | * 9/1997 | Haboian et al. | 340/605 |
| 5,827,950 | * 10/1998 | Woodbury et al. | 73/40.5 R |
| 5,850,037 | * 12/1998 | Mullins | 73/40.5 R |

FOREIGN PATENT DOCUMENTS

| | | |
|---|---|---|
| 3-89100 | 4/1991 | (JP) . |
| 3-292496 | 12/1991 | (JP) . |
| 3-292497 | 12/1991 | (JP) . |
| 5-180398 | 7/1993 | (JP) . |
| 5-280695 | 10/1993 | (JP) . |

* cited by examiner

*Primary Examiner*—Hezron Williams
*Assistant Examiner*—David J. Wiggins
(74) *Attorney, Agent, or Firm*—Ostrolenk, Faber, Gerb & Soffen, LLP

(57) ABSTRACT

A method of the present invention automatically detects gas leak from a valve on a gas-containing vessel, or the like, based on detected absolute pressure and pressure fluctuation. The method can detect both fine leak and gross leak. The method comprises a method for automatically detecting gas leak from a target object provided on gas piping comprising the steps of: issuing command for forming an airtight room communicating with said target object; issuing command for pressurizing said airtight room until a predetermined pressure; detecting absolute pressure and pressure fluctuation of said airtight room, measured with a gauge; and discriminating whether gas leaks from said target object or not based on the detected absolute pressure and pressure fluctuation.

16 Claims, 8 Drawing Sheets

METHOD AND APPARATUS FOR AUTOMATICALLY DETECTING GAS LEAK, AND RECORDING MEDIUM FOR LEAK DETECTION

BACKGROUND OF THE INVENTION a) Field of the Invention

The present invention relates to a method and apparatus for automatically detecting gas leak in a valve on a gas-containing vessel, etc. or a connector, and a recording medium storing a program for the automatic gas leak detection.

b) Description of the Related Art

For example, Laid-open Japanese Patent Application No. Hei 3-89100 discloses a method for automatically detecting gas leak in a valve on a gas-containing vessel. According to the conventional method, detection of gas leak is based on measured pressure fluctuation of helium gas which is filled in an airtight room communicating with a valve on a gas-containing vessel.

SUMMARY OF THE INVENTION

It is an object of the present invention to provide an improved gas leak detection method or an apparatus which can automatically detect both fine gas leaks and gross gas leaks, and a recording medium storing a program for the automatic gas leak detection.

According to an aspect of the present invention, there is provided a method for automatically detecting gas leak in a target object provided on gas piping, which comprises the steps of: forming an airtight room communicating with said target object; pressurizing said airtight room to a predetermined pressure; measuring absolute pressure and pressure fluctuation of said airtight room; and determining whether gas leaks in said target object or not based on the measured absolute pressure and pressure fluctuation.

According to this method, gas leak is detected regardless of the leakage rate, because of detecting both the pressure fluctuation and absolute pressure in the airtight room.

According to another aspect of the present invention, there is provided a method for detecting gas leak in a valve provided on a gas-containing vessel comprising the steps of: forming an airtight room communicating with said valve; evacuating said airtight room; measuring absolute pressure and pressure fluctuation of said airtight room while keeping said airtight room hermetic after the evacuation is stopped; and determining whether gas leaks in said valve or not based on the measured absolute pressure and pressure fluctuation.

According to this gas leak detection method, both the absolute pressure and pressure fluctuation in the evacuated airtight room are measured. Then, seat leak in a valve is detected based on the measured absolute pressure and pressure fluctuation. Since the absolute pressure of the airtight room rapidly increases when the gas leaks in the valve on the gas-containing vessel at a high leakage rate, gross leak is detected based on the measured absolute pressure. Since the pressure of the airtight room increase slowly and gradually when the gas leaks in the valve on the gas-containing vessel at a low leakage rate, fine leak is detected based on the measured pressure fluctuation. Therefore, the seat leak is detected without failure regardless of the leakage rate.

According to a further aspect of the present invention, there is provided a method for detecting gas leak in a connector detachably connecting a gas pipe from a valve on a gas-containing vessel, comprising the steps of: forming an airtight room communicating with said connector and with said valve via said gas pipe; evacuating said airtight room; introducing gas into said airtight room after the evacuation is stopped; measuring absolute pressure and pressure fluctuation in said airtight room filled with said gas while keeping said airtight room hermetic; and determining whether gas leaks from said connector or not based on the measured absolute pressure and pressure fluctuation.

According to this gas leak detection method, absolute pressure and pressure fluctuation in an airtight room filled with gas are measured, and it is determined whether the gas leaks in a connector or not based on the measured absolute pressure and pressure fluctuation. In the case where the gas leaks from the connector at a relatively large leakage rate, the absolute pressure of the airtight room reduces rapidly, and the absolute pressure equals to the atmospheric pressure eventually. Therefore, the gas leak whose leakage rate is relatively large (gross leak) is detected based on the measured absolute pressure. On the contrary, if the gas leaks from the connector at a relatively small leakage rate, the pressure of the airtight room reduces gradually. Therefore, the gas leak when leakage rate is relatively small (fine leak) is detected based on the measured pressure fluctuation. Accordingly, the method can detect gas leak without failure regardless of the leakage rate.

DETAILED DESCRIPTION OF THE PREFERRED EMBODIMENT

According to a research carried out by the inventors of the present invention, it was found out that such a conventional method which depends on pressure fluctuation cannot detect gas leak when leakage rate is relatively large.

Figure 1:
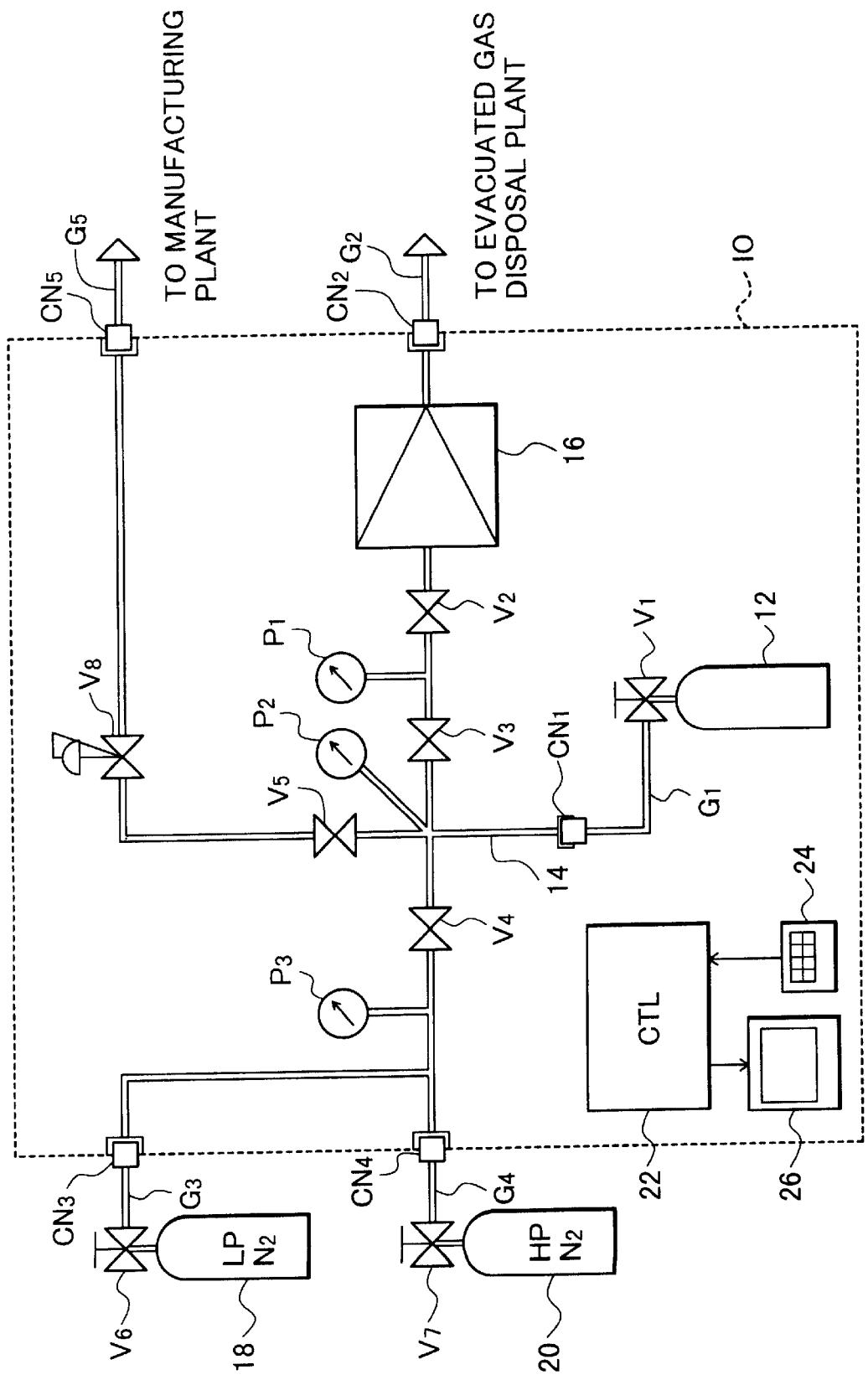
FIG. 1 is a piping diagram of a gas plant according to a research carried out by the inventors.

FIG. 1 shows a gas plant employed in a research carried out by the inventors. This plant supplies a source (material) gas such as monosilane gas, nitrogen-diluted phosphine, or the like to a semiconductor device manufacturing plant or the like. The pressure of filled 100% monosilane gas is, for example, approximately 50 kgf/cm$^2$. The pressure of the filled nitrogen-diluted phosphine is approximately 150 kgf/cm$^2$.

A gas plant 10 is has a box-like main body. The main body has connectors $CN_1$ to $CN_5$. The connectors $CN_1$ to $CN_5$ detachably connect gas pipes $G_1$ to $G_5$ respectively. The gas pipe $G_1$ is connected to a valve (vessel's main valve) $V_1$ on a vessel 12 containing the source gas. The gas pipe $G_2$ is connected to an evacuated gas disposal (processing) plant (not shown). The gas pipe $G_3$ is connected to a valve (vessel's main valve) on a gas-containing vessel 18, which may be used commonly with other facilities. The vessel 18 contains gas to be used in purging step or low-pressured nitrogen gas for low-pressure gas leakage test (the pressure of supplied gas is 6 kgf/cm$^2$). The gas pipe $G_4$ is connected to a valve (vessel's main valve) $V_7$ on a gas-containing vessel 20, which may also be used commonly with other facilities. The vessel 20 contains high-pressured nitrogen gas for high-pressure gas leakage test (the pressure of supplied gas is 100 kgf/cm$^2$). The gas pipe $G_5$ is connected to the manufacturing plant (not shown). The gas-containing vessel 12 is housed in the gas plant 10.

The gas plant 10 comprises the valves $V_2$ to $V_5$, a pressure reducing valve $V_8$, pressure gauges $P_1$ to $P_3$, a piping 14, an evacuation (vacuum) pump 16, and the like. The valves $V_3$ to $V_5$ are connected to the connector $CN_1$ via the piping 14. The piping 14 has the pressure gauge $P_2$. The valve $V_2$ and the evacuation pump 16 are provided on a pipe between the valve $V_3$ and the connector $CN_2$. The pressure gauge $P_1$ is provided on a pipe between the valves $V_2$ and $V_3$. The valve $V_4$ is provided on a branch pipe (meeting pipe) connecting the connectors $CN_3$ and $CN_4$. The pressure gauge $P_3$ is provided on the branch pipe. The valve $V_5$ is connected to the connector $CN_5$ with a pipe via the pressure reducing valve $V_8$.

Each of the gauges $P_1$ to $P_3$ measures gauge pressure with respect to the atmospheric pressure (=0 kgf/cm$^2$). They can measure the gauge pressure even when the pressure is reduced from the atmospheric pressure. In this case, the gauges indicate the measured pressure by negative values. The pressure gauge $P_1$ measures pressure in the pipe evacuated by the evacuation pump 16. The pressure gauge $P_2$ measures pressure in the pipe 14. The pressure gauge $P_3$ measures pressure of nitrogen gas supplied from the gas-containing vessel 18 or 20.

Since the maximum pressure applicable to the pressure gauges P1 to P3 may be about 150 kgf/cm$^2$ supplied from the source gas vessel 12 or the high pressure $N_2$ vessel 20, the pressure gauges P1 to P3 are selected from those which can endure a pressure of about 200 kgf/cm$^2$. For example, the pressure gauges P1 to P3 are pressure transducers utilizing vacuum deposition type semiconductor strain gauges having measurement ranges of vacuum to 200 kgf/cm$^2$ (e.g. ZT15 series available from Nagano Keiki, Japan). Such pressure gauges have a measuring accuracy of ±1% in ordinary type, and a measuring accuracy of ±0.5% in high precision type.

The gas plant 10 comprises a control unit 22 with a touch panel (input panel) 24, a display unit 26 and the like. The control unit 22 is used for controlling the valves $V_1$ to $V_8$, the connectors $CN_1$ to $CN_5$, the evacuation pump 16 and the like. The control unit 22 will be described later with reference to FIG. 2.

The source gas contained in the vessel 12 is supplied to the manufacturing plant through the valve $V_1$, the connector $CN_1$, the pipe 14, the valve $V_5$, the pressure reducing valve $V_8$, and the connector $CN_5$. As the gas is supplied to the manufacturing plant, the gas remained in the vessel 12 is reduced. The valve $V_1$ on the vessel 12 is closed when the amount of remained gas is equal to or less than a predetermined amount, and the gas supply is stopped. Then, the gas pipe $G_1$ which is connected to the valve $V_1$ on the vessel 12 is disconnected from the connector $CN_1$. The vessel 12 is replaced with a new one which is fully charged with the source gas. The new vessel 12 also has its valve $V_1$, and the gas pipe $G_1$ is connected thereto. The connector $CN_1$ reconnects the gas pipe $G_1$ from the new vessel 12. Then, the valve $V_1$ is opened to supply the gas again.

Before the vessel exchange operation, the following seven steps are automatically taken to detect seat leak in the valve $V_1$ on the vessel 12.

1: Close the valves $V_1$ to $V_5$. An airtight room is formed in the pipe 14 if the valves $V_1$ and $V_3$ to $V_5$ work effectively.

2: Open the valve $V_2$, and activate the evacuation pump 16.

3: Check the operation of the evacuation pump 16 by monitoring the pressure gauge $P_1$. If vent malfunction is detected, alarm informing the malfunction is issued.

4: Open the valve $V_3$ to evacuate the pipe 14. If the gas leaks at the seat of the valve $V_1$, the pipe 14 is not evacuated to a predetermined level because the seat leak allows the gas to be continuously supplied to the pipe 14.

5: Check achievable vacuum pressure by monitoring the pressure gauge $P_2$. If ultimate vacuum pressure is irregular, alarm informing the unsatisfactory evacuation is issued.

6: Close the valves $V_2$ and $V_3$, and turn off the evacuation pump 16.

7: Measure pressure fluctuation in the pipe 14 by monitoring the pressure gauge $P_2$ for a predetermined time period. If the gas leaks at the seat of the valve $V_1$, the pressure in the pipe 14 gradually increase. It is determined whether the seat leak at the valve $V_1$ occurs or not based on the measured pressure fluctuation. If the seat leak is detected, alarm informing the seat leak is issued.

Such a seat leak detection method has the following problem. The seat leak is not detected at the fifth step of the detection sequence if the leakage rate is relatively large. For example, the seat of the valve $V_1$ may be damaged by extraneous substances and the leakage rate is approximately 1 l/min. The inventors analyzed the reasons of the above problem as follows. (1) The evacuation pump 16 may evacuate the airtight room at a rate which is greater than the leakage rate of the seat leak at the valve $V_1$. (2) Since the range of the pressure gauge $P_2$ is vacuum to 200 kgf/m$^2$, the pressure which is less than 0 kgf/cm$^2$ should be discriminated at the fifth step as the regular pressure. (3) Since the accuracy in measuring the pressure is approximately ±1% of the range, error of ±2 kgf/cm$^2$ is allowed. Under the above conditions, the seat leak at the valve $V_1$ is not detected at the fifth step of the detection sequence.

Moreover, the pressure rising may not be detected at the seventh step of the detection sequence in spite of monitoring it with the pressure gauge $P_2$. In the case where the pressure of the source gas remained in the vessel 12 is approximately 6 kgf/cm$^2$ and the leakage rate of the seat leak at the valve $V_1$ is 1 l/min, the pressure in the pipe 14 has already increased to approximately 6 kgf/cm$^2$ which is almost equal to the pressure in the vessel 12 when the seventh step of the detection sequence begins. That is, the pressure fluctuation is not detected at the seventh step of the detection sequence in spite of monitoring the pressure rising for a predetermined time period, because the pressure fluctuation has already been converged.

Accordingly, such a conventional detection method may fail to detect the seat leak at the valve $V_1$. If the seat leak is missed and the vessel 12 is exchanged by releasing the connector $CN_1$, huge amount of source gas may leak from the valve $V_1$ on the removed vessel 12.

In the gas plant shown in FIG. 1, following thirteen steps are automatically taken to detect the gas leak from the connector $CN_1$ after the vessel 12 is replaced with new one (the gas pipe $G_1$ connected to the valve $V_1$ is reconnected to the connector $CN_1$). This detection sequence is executed before the valve $V_1$ is opened.

1: Close the valves $V_1$ to $V_5$.

2: Open the valve $V_2$ and activate the evacuation pump 16.

3: Check the operation of the evacuation pump 16 by monitoring the pressure gauge $P_1$. If vent malfunction is found, alarm informing the malfunction is issued.

4: Open the valve $V_3$ to evacuate the pipe 14. If the pipe 14 constitute an airtight room therein, the pipe 14 is evacuated effectively.

5: Check ultimate vacuum pressure in the pipe 14 by monitoring the pressure gauge $P_2$. If the measured ultimate vacuum pressure is irregular, alarm informing the insufficient evacuation is issued.

6: Open the valve $V_7$ to introduce high-pressured nitrogen gas into the pipe connected to the valve $V_4$.

7: Check the pressure of the supplied high-pressured nitrogen gas by monitoring the pressure gauge $P_3$. If the measured pressure of the high-pressured nitrogen gas is irregular, alarm informing an insufficient high pressure charge is issued.

8: Close the valves $V_2$ and $V_3$, and turn off the evacuation pump 16.

9: Open the valve $V_4$ to introduce high-pressured nitrogen gas into the pipe 14.

10: Close the valve $V_7$.

11: Close the valve $V_4$ to form an airtight room in the pipe 14.

12: Have a predetermined waiting time period until pressure fluctuation is converged. The pressure fluctuation is caused by the adiabatic compression which occurs when high-pressured gas is introduced into airtight room. It takes a few minutes until the pressure fluctuation is converged. If the gas leaks in the connector $CN_1$, the pressure in the pipe 14 reduces gradually.

13: Measure the pressure fluctuation for a predetermined time period by monitoring the pressure gauge $P_2$. It is determined whether the gas leaks from the connector $CN_1$ or not based on the measured pressure fluctuation. If it is determined that the gas leaks, alarm informing the gas leak is issued.

Such a method for detecting gas leak in the connector as described above has the following problem. Gas leak in a connector is not detected at the fifth step of the detection sequence if the leakage rate is relatively large. For example, sealing member of the connector $CN_1$ does not work effectively or sealed portion of the connector $CN_1$ is contaminated, and the leakage rate is approximately 1 l/min. The inventors analyzed the reasons of the above problem as follows. (1) The rate of evacuation by the evacuation pump 16 is greater than the leakage rate of the gas leak from the connector $CN_1$. (2) By the same reason as the seat leak detection, the pressure which is less than 0 $kgf/cm^2$ should be discriminated at the fifth step as the regular pressure. (3) By the same reason as the seat leak detection, error of ±2 $kgf/cm^2$ is allowed. Under the above conditions, the gas leak in the connector $CN_1$ is not detected at the fifth step of the detection sequence.

Moreover, the pressure fluctuation is not detected at the thirteenth step of the detection sequence in spite of monitoring it with the pressure gauge $P_2$. In the case where the leakage rate of gas leak from the connector $CN_1$ is approximately 1 l/min, the pressure in the pipe 14 has already been approximately 0 $kgf/cm^2$, which is equal to the atmospheric pressure, when the thirteenth step of the detection sequence begins. That is, the pressure fluctuation is not detected at the thirteenth step of the detection sequence in spite of monitoring the pressure rising for a predetermined time period, because the pressure fluctuation has already been converged.

Accordingly, such a conventional detection method may fail to detect the gas leak from the connector $CN_1$. If the gas leak is missed and the valve $V_1$ is opened, huge amount of source gas may leak from the connector $CN_1$.

Figure 2:
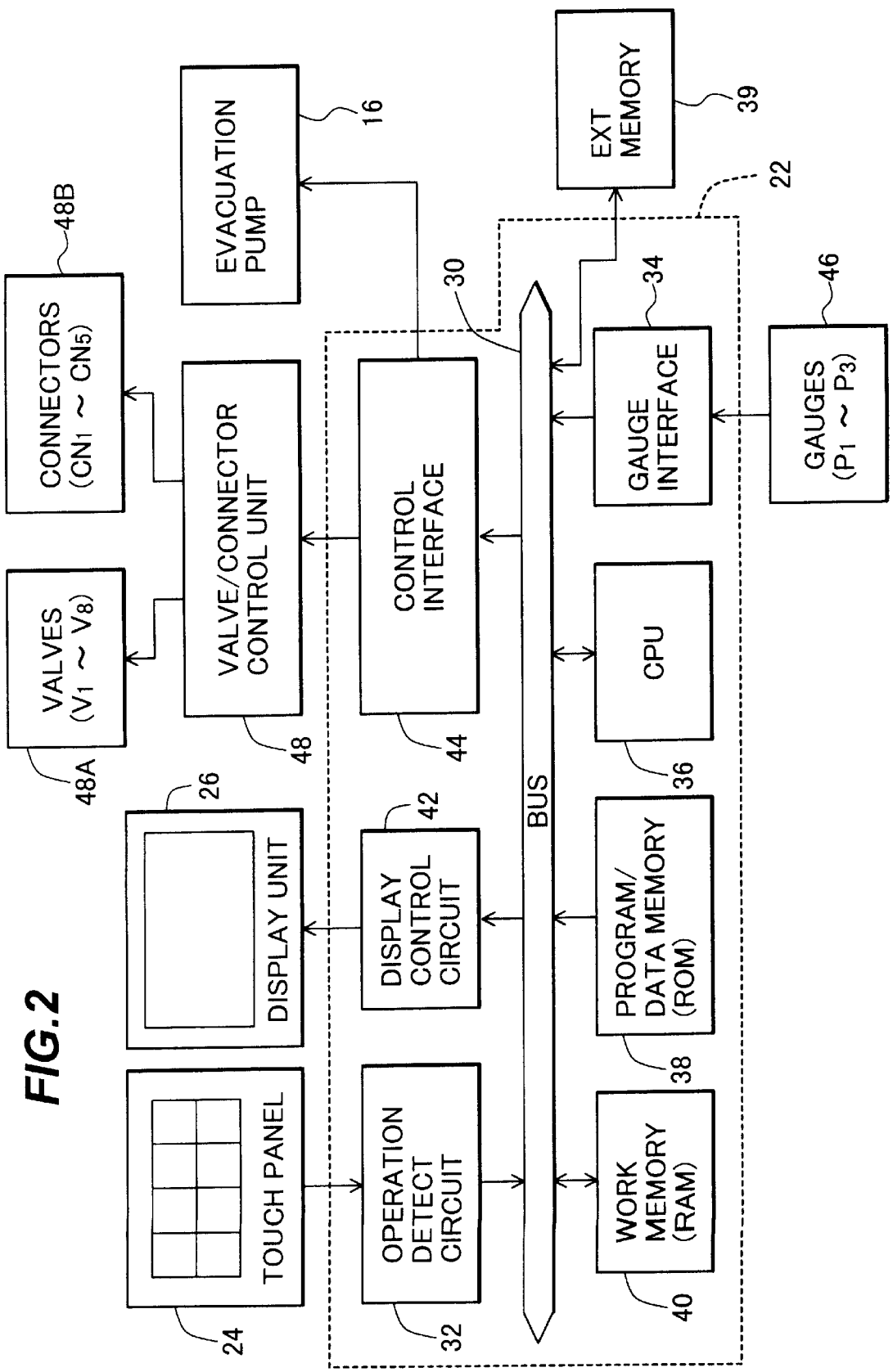
FIG. 2 is a block diagram showing a control section of the gas plant shown in FIG. 1.

FIG. 2 shows a control section of the gas plant 10 shown in FIG. 1. The control section works as a gas leak detection apparatus according to an embodiment of the present invention. The control unit 22 is provided in the control section shown in FIG. 2. The control unit 22 comprises a microcomputer and controls open/close operation of the valves, connection/disconnection of the connectors, evacuation, pressure measuring, and the like in accordance with a program.

An operation detect circuit 32, a gauge interface 34, a CPU (central processing unit) 36, a program/data memory 38, a work memory 40, a display control circuit 42, a control interface 44, an external memory 38A, and the like are connected each other via a bus 30.

The operation detect circuit 32 detects input signals from the touch panel 24. An operator can input desired commands and data by touching the touch panel 24.

The gauge interface 34 reads measured data such as pressure data from gauges 46 including the pressure gauges $P_1$ to $P_3$.

The CPU 36 executes various operations such as gas leak detection in accordance with a program stored in the memory 38. Operations executed by the CPU 36 will be described later with reference to FIGS. 3 to 7.

The memory 38 is, for example, a ROM (read only memory) for storing data such as comparison reference data in addition to the aforementioned program.

The external memory 39A is arbitrarily connected to the bus 30.

Instead of the ROM 38, an external storage device 39 may store the program. The external storage device 39 is, for example, a hard disk drive, a removable storage disk drive, or the like. As a removable storage disk drive, a floppy disk drive, a CD-ROM drive, a DVD drive, an MO drive, or the like may be used. The program can be updated or reinstalled easily with such a removable disk storage.

The work memory 40 is a RAM (random access memory) and includes storage areas. The CPU 36 uses those storage areas as registers.

The display control circuit 42 controls the display unit 26. The display unit 26 displays status of valve (open/close) operations, connector (connection/disconnection) operations, evacuation, pressure measuring and the like. The display unit 26 also displays current status of procedure.

The control interface 44 supplies control signals to the evacuation pump 16 and a valve/connector control unit 48, in accordance with instruction from the CPU 36. The valve/connector control unit 48, for example, pneumatically controls the valves $V_1$ to $V_8$ of valves 48A and the connectors $CN_1$ to $CN_5$ of connectors 48B.

Figure 3:
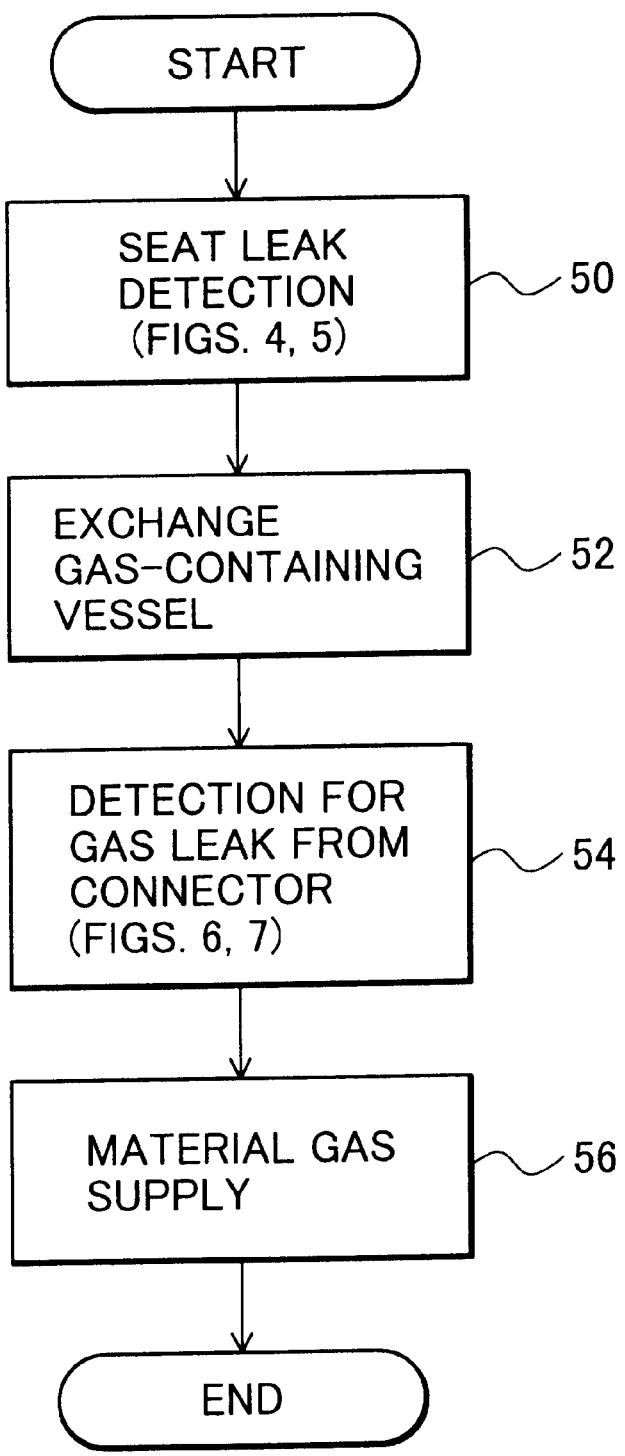
FIG. 3 is a flowchart of a source gas supply routine with a gas-containing vessel exchange operation.

FIG. 3 is a flowchart of a routine for source gas supply with a vessel exchange operation. The operation is carried out by the CPU 36 under the control program stored in ROM 38 (FIG.2). Seat leak is detected in step 50. In this step, fine leak and gross leak at the valve $V_1$ on the vessel 12 are detected. Operations thereof will be described later with reference to FIGS. 4 and 5. If the seat leak is not detected by step 50, the flow goes to step 52.

In step 52, the vessel 12 is replaced with new one. More precisely, the gas pipe $G_1$ connected to the valve $V_1$ on the vessel 12 is disconnected from the connector $CN_1$, and then the vessel 12 is replaced with new one. The connector $CN_1$ is then fitted and connected tightly to the gas pipe $G_1$ connected to the valve $V_1$ on the new vessel 12.

Gas leak from the connector is detected in step 54. In this step, fine leak and gross leak are detected for the connector $CN_1$ connected to the gas pipe $G_1$ which is connected to the valve $V_1$ on the new vessel 12. Operations for this detection will be described later with reference to FIGS. 6 and 7. If the gas leak from the connector is not detected by step 54, the flow goes to step 56.

In step 56, the valves $V_5$, $V_6$, etc. are adjusted to supply the source gas in the vessel 12 at a desired pressure to a gas consumption facilities in the manufacturing plant.

Figure 4:
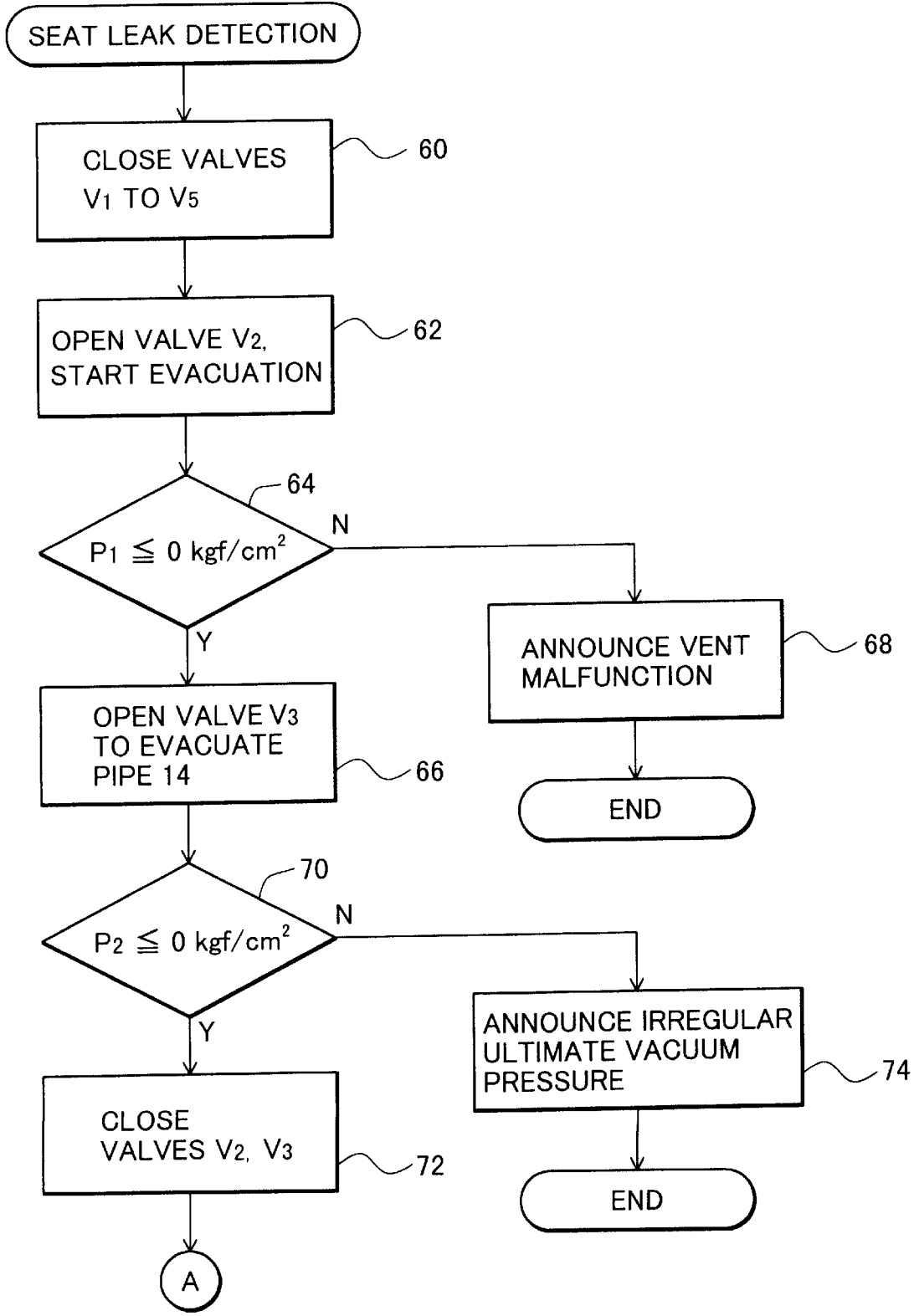
FIG. 4 is a flowchart showing front steps of a seat leak detection routine.
Figure 5:
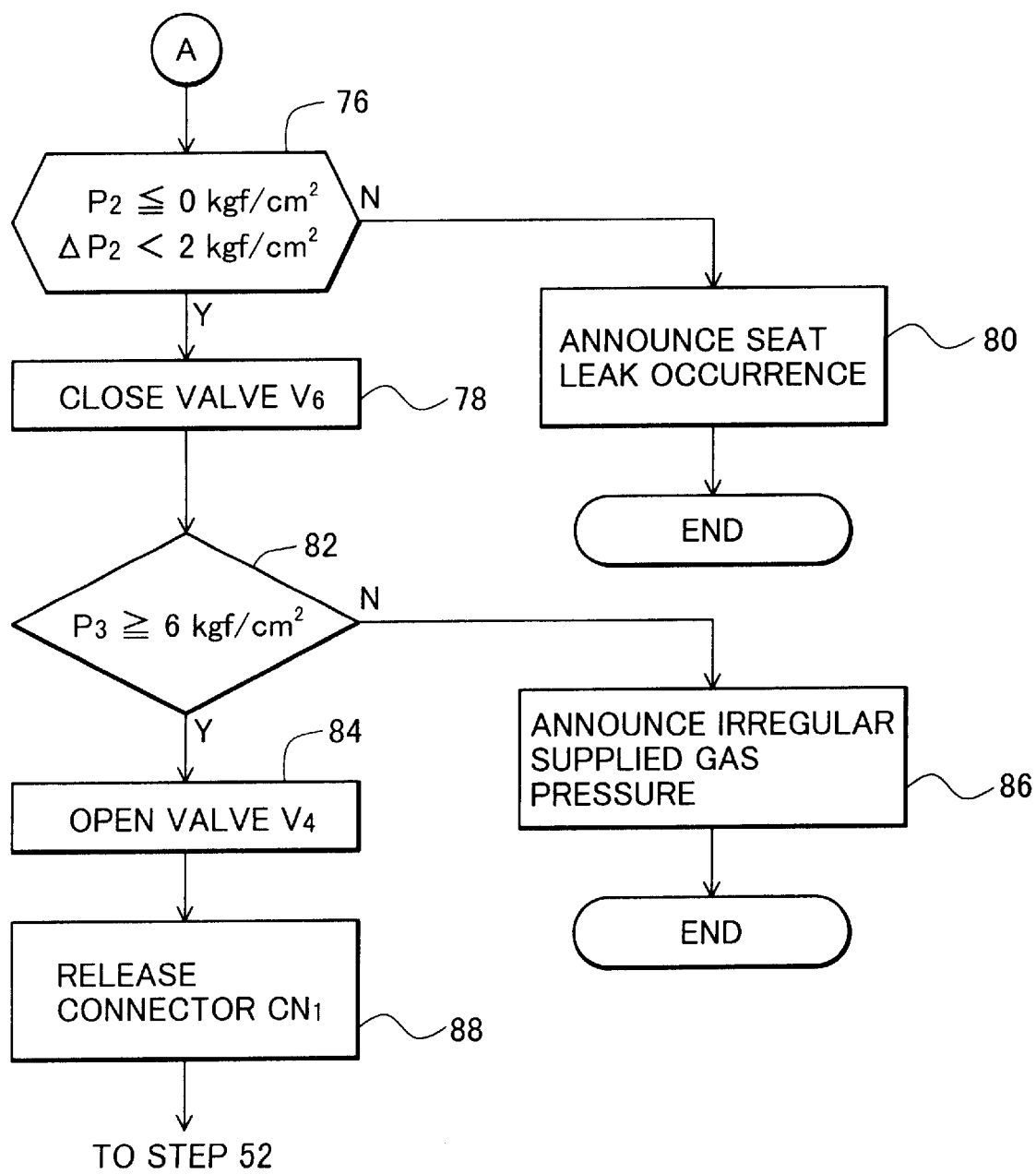
FIG. 5 is a flowchart showing the rest of the steps of the seat leak detection.

FIGS. 4 and 5 show a flowchart of a seat leak detection routine. In step 60, command signals are sent to close the valves $V_1$ to $V_5$ to establish an airtight room at gas passage in the piping from the gas pipe $G_1$ to the pipe 14.

In step 62, signals for opening the valve $V_2$, and activating the evacuation pump 16 are sent to start evacuation. Then, the flow goes to step 64.

In step 64, the pressure measured with the pressure gauge $P_1$ is derived and discrimination is done whether measured pressure $P_1$ is equal to or less than 0 kgf/cm². If the measured pressure $P_1$ is equal to 0 kgf/cm² or less, it is discriminated that the evacuation pump 16 works normally, and the flow goes to step 66. If the measured pressure is greater than 0 kgf/cm², the flow goes to step 68 to announce the operator that vent malfunction is occurring. Such announcement is given by display on the display unit 26 and/or alarming. Any announcing operation hereafter employs this method. The routine is terminated after the event of step 68 is completed.

When the measured pressure $P_1$ is negative or zero, discrimination is done that the vent operation is normal in step 64 and the flow to step 66.

In step 66, signal for opening the valve $V_3$ is issued to evacuate the airtight room in the pipe 14. Then, the flow goes to step 70.

In step 70, the pressure measured with the pressure gauge $P_2$ is derived, and discrimination is done whether the measured pressure $P_2$ is equal to or less than 0 kgf/cm². If the measured pressure $P_2$ is equal to 0 kgf/cm² or less, it is discriminated that ultimate vacuum pressure is normal, and the flow goes to step 72. If the measured pressure $P_2$ is greater than 0 kgf/cm², it is discriminated that the ultimate vacuum pressure is abnormal and the flow goes to step 74 to announce that ultimate vacuum pressure is abnormal. The routine is terminated after the event of step 74 is completed.

In step 72, signals for closing the valves $V_2$ and $V_3$ are issued so as to keep the airtight room hermetic, and then the evacuation pump 16 is turned off. Then, the flow goes to step 76.

In step 76, absolute pressure and pressure fluctuation of the airtight room measured with the pressure gauge $P_2$ are detected for a predetermined time period. It is discriminated whether the measured absolute pressure $P_2$ is equal to or less than 0 kgf/cm² and the measured pressure fluctuation $\Delta P_2$ is less than 2 kgf/cm². $P_2 \leq 0$ kgf/cm² is a condition given for gross leak detection, and $\Delta P_2 < 2$ kgf/cm² is a condition given for fine leak detection.

When both conditions are fulfilled, it is discriminated that neither fine leak nor gross leak is occurring, and the flow goes to step 78. If the conditions are not fulfilled, the flow goes to step 80 to announce that the seat leak is occurring. The routine is terminated after the event of step 80 is completed.

In step 78, signals for closing the valve $V_6$ and introducing low-pressured nitrogen gas from the vessel 18 into the pipe $G_3$ and the pipe from the connector $CN_3$ to the valve $V_4$ are issued. The flow goes to step 82 after the event of step 78 is completed.

In step 82, the pressure measured with the pressure gauge $P_3$ is derived, and it is discriminated whether the measured pressure $P_3$ is equal to or greater than 6 kgf/cm². If the measured pressure $P_3$ is equal to 6 kgf/cm² or greater, it is discriminated that the pressure of the supplied gas is normal, and the flow goes to step 84. If the measured pressure $P_3$ is less than 6 kgf/cm², it is discriminated that the supplied pressure is abnormal and the flow goes to step 86 to announce that the measured pressure is abnormal. The routine is terminated after the event of step 86 is completed.

In step 84, signals for opening the valve $V_4$ to introduce the low-pressured nitrogen gas into the pipe 14 are issued. The source gas in the pipe 14 is purged by the introduced low-pressured nitrogen gas. Then, the flow goes to step 88. In step 88, signals for releasing the connector $CN_1$ are issued to exchange the vessel. When the connector $CN_1$ is released, the low-pressured nitrogen gas is spouted out therefrom. This prevents inside the pipe 14 from being contaminated by oxygen and water in the atmosphere. The flow goes to step 52 for a vessel exchange operation shown in FIG. 3 after the event of step 88 is completed.

According to the above described automated seat leak detection, seat leak at the valve $V_1$ whose leakage rate is equal to or greater than $1 \times 10^{-2}$ l/min is detected when the airtight room in the pipe 14 and the pipe $G_1$ has a volume of 30 cm³ and the absolute pressure and pressure fluctuation of the airtight room are detected for 6 minutes in step 76.

Even when the pressure of the source gas remained in the vessel 12 is approximately 6 kgf/cm² and the leakage rate of the seat leak at the valve $V_1$ is approximately 1 l/min, at a point when the event of step 76 starts, the absolute pressure in the pipe 14 should have already reached approximately 6 kgf/cm². Thus, the condition for the gross leak detection (the absolute pressure $P_2 \leq 0$ kgf/cm²) is not fulfilled. Therefore, the seat leak is detected and announcement on it can be given.

Figure 6:
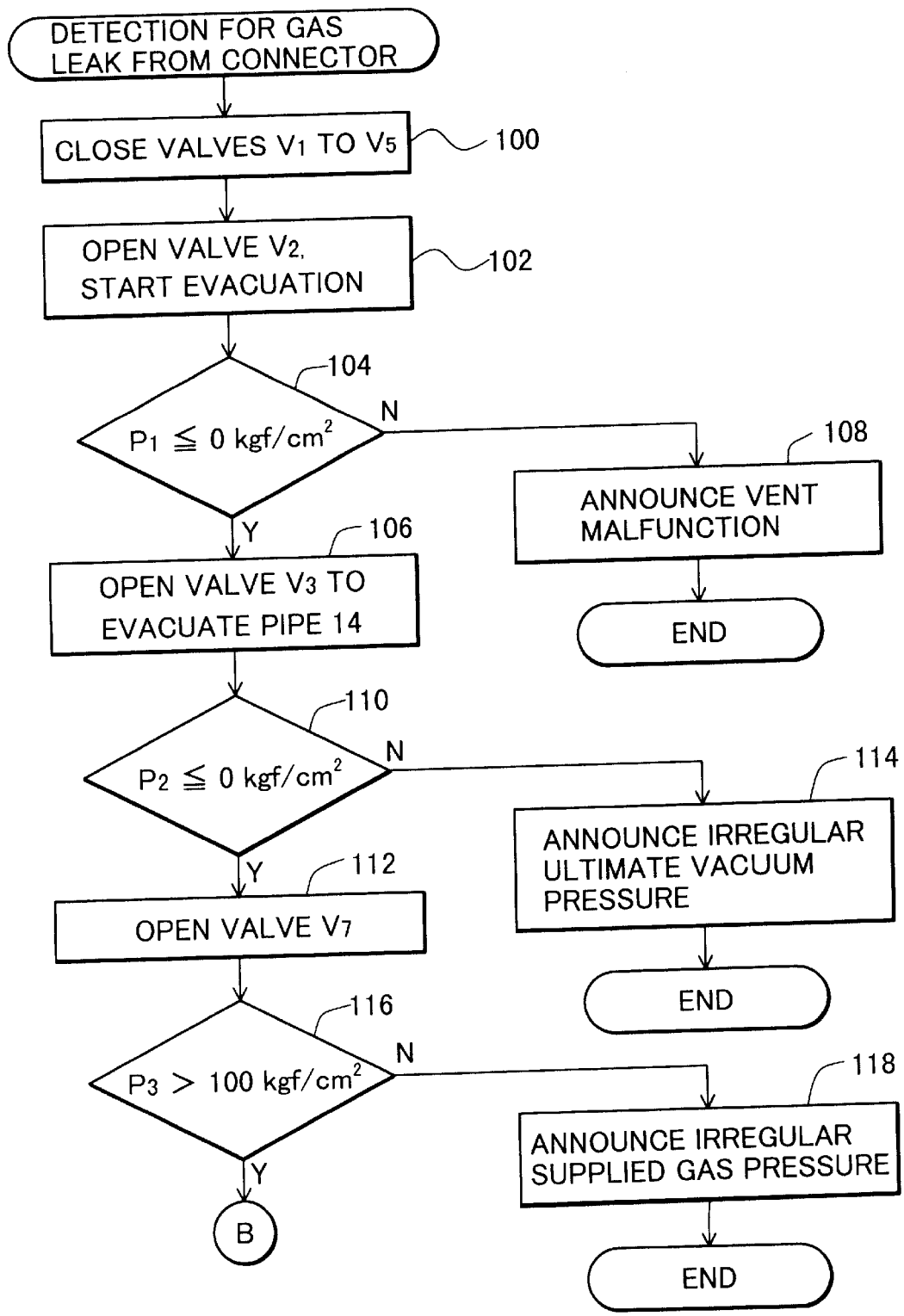
FIG. 6 is a flowchart showing front steps of a routine for detecting gas leak in a connector.
Figure 7:
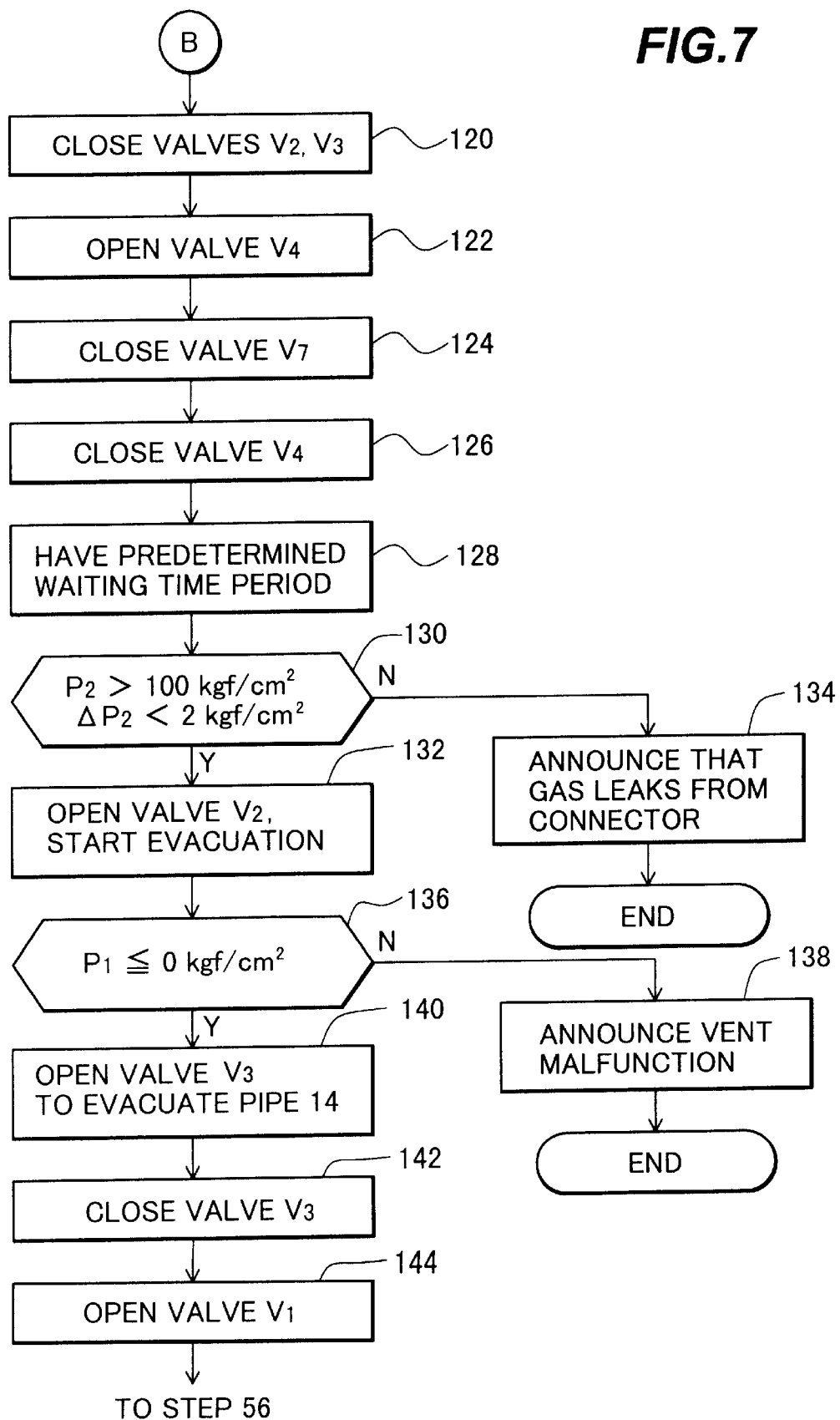
FIG. 7 is a flowchart showing the rest of the steps of the routine for detecting the gas leak in the connector.

FIGS. 6 and 7 show a flowchart of a routine for detecting gas leak from the connector. In step 100, signals for closing the valves $V_1$ to $V_5$ is issued to make the gas passage in the gas pipe $G_1$ and the pipe 14 hermetic.

In step 102, signals for opening the valve $V_2$ and activating the evacuation pump 16 are issued for evacuating the hermetic room. Then, the flow goes to step 104.

In step 104, the pressure measured with the pressure gauge $P_2$ is detected, and it is discriminated whether the measured pressure $P_2$ is equal to or less than 0 kgf/cm². If the measured pressure $P_2$ is equal to 0 kgf/cm² or less, it is discriminated that the evacuation pump 16 works normal, and the flow goes to step 106. If the measured pressure $P_2$ is greater than 0 kgf/cm², it is discriminated that the evacuation is abnormal and the flow goes to step 108. In step 108, announcement is issued that vent malfunction is detected. The routine is terminated after the event of step 108 is completed.

In step 106, signals for opening the valve $V_3$ are issued to evacuate the airtight room in the pipe 14. Then, the flow goes to step 110.

In step 110, the pressure measured with the pressure gauge $P_2$ is detected, and it is discriminated whether the measured pressure $P_2$ is equal to or less than 0 kgf/cm$^2$. If the measured pressure $P_2$ is equal to 0 kgf/cm$^2$ or less, it is discriminated that the ultimate vacuum pressure is normal, and the flow goes to step 112. If the measured pressure $P_2$ is greater than 0 kgf/cm$^2$, it is discriminated that the detected pressure is abnormal, and the flow goes to step 114. In step 114, announcement is issued that ultimate vacuum pressure is abnormal. The routine is terminated after the event of step 114 is completed.

In step 112, signals for opening the valve $V_7$ is issued to introduce high-pressured nitrogen gas from the vessel 20 into the pipe $G_4$ and the pipe from the connector $CN_4$ to the valve $V_4$. The flow goes to step 116 after the event of step 112 is completed.

In step 116, the pressure measured with the pressure gauge $P_3$ is detected, and it is discriminated whether the measured pressure $P_3$ is equal to or greater than 10 kgf/cm$^2$. If the measured pressure $P_3$ is equal to 10 kgf/cm$^2$ or greater, it is discriminated that the pressure of the supplied high-pressured nitrogen gas is normal, and the flow goes to step 120. If the measured pressure $P_3$ is less than 10 kgf/cm$^2$, it is discriminated that the supplied pressure is abnormal and the flow goes to step 118. In step 118, announcement is issued that the measured pressure is irregular.

In step 120, signals for closing the valves $V_2$ and $V_3$ and turning-off the evacuation pump 16 are issued. Then, the flow goes to step 122.

In step 122, signals for opening the valve $V_4$ are issued to introduce high-pressured nitrogen gas into the airtight room. Then, the flow goes to step 124. In step 124, signals for closing the valve $V_7$ are issued to stop the supply of the high-pressured nitrogen gas.

In step 126, signals for closing the valve $V_4$ are issued to keep the airtight room hermetic. Then, the flow goes to step 128. In step 128, time is measured for waiting convergence of pressure fluctuation caused by the adiabatic compression. It takes a few minutes until the pressure fluctuation is converged. The flow goes to step 130 after the event of step 128 is completed.

In step 130, absolute pressure and pressure fluctuation of the airtight room measured with the pressure gauge $P_2$ are detected for a predetermined time period. It is discriminated whether the detected absolute pressure $P_2$ is greater than 100 kgf/cm$^2$ and the detected pressure fluctuation $\Delta P_2$ is less than 2 kgf/cm$^2$. $P_2>100$ kgf/cm$^2$ is a condition given for gross leak detection, and $\Delta P_2<2$ kgf/cm$^2$ is a condition given for fine leak detection.

If the above conditions are fulfilled, it is discriminated that neither fine leak nor gross leak is occurring, and the flow goes to step 132. If either of the conditions is not fulfilled, it is discriminated that the connector is abnormal and the flow goes to step 134. In step 134, announcement is issued that the gas leaks from the connector. The routine is terminated after the event of step 134 is completed.

In step 132, signals for opening the valve $V_2$ and turning-on the evacuation pump 16 to start evacuation are issued. Then, the flow goes to step 136.

In step 136, the pressure measured with the pressure gauge $P_1$ is detected, and it is discriminated whether the measured pressure $P_1$ is equal to or less than 0 kgf/cm$^2$. If the measured pressure is equal to 0 kgf/cm$^2$ or less, it is discriminated that the evacuation pump 16 works normal, and the flow goes to step 140. If the measured pressure is greater than 0 kgf/cm$^2$, it is discriminated that the vent operation is abnormal, and the flow goes to step 138. In step 138, announcement is issued that vent operation is abnormal. The routine is terminated after the event of step 138 is completed.

In step 140, signals for opening the valve $V_3$ are issued to evacuate the airtight room in the pipe 14. Nitrogen gas contained in the pipe 14 is also evacuated.

In step 142, signals for closing the valve $V_3$ are issued to keep the airtight room hermetic. Then, the flow goes to step 144. In step 144, signals for opening the valve $V_1$ are issued to introduce source gas from the vessel 12 into the airtight room. The flow goes to step 56 for source gas supply process shown in FIG. 3.

According to the above method for automatically detecting gas leak from the connector, gas leak from the connector $CN_1$ whose leakage rate is equal to or greater than $1\times10^{-3}$ l/min can be detected, provided that the airtight room in the pipe 14 and the pipe $G_1$ has a volume of 30 cm$^3$, and the absolute pressure and pressure fluctuation of the airtight room are measured for 60 minutes in step 130.

In the case, for example, where the pressure of supplied high-pressured nitrogen gas is 150 kgf/cm$^2$ and the gas leaks from the connector $CN_1$ at the leakage rate of 1 l/min, measured absolute pressure in the pipe 14 is 150 kgf/cm$^2$ when the event of the step 128 starts and is reduced to be equal to or less than 100 kgf/cm$^2$ after approximately 1.5 minutes has lapsed since the beginning of the event of step 128. If the absolute pressure is thus reduced, the condition for detecting the gross leak (absolute pressure $P_2>100$ kgf/cm$^2$) is not fulfilled. Therefore, the gas leak from the connector can be detected and the operator can know it by the announcement.

When there is fine leak, even when the absolute pressure exceeds 100 kgf/cm$^2$ at the beginning of step 130 and the condition for gross leak detection is fulfilled, the pressure in the pipe 14 gradually reduces due to the gas leak. As a result, the condition for fine leak detection (pressure fluctuation $\Delta P_2<2$ kgf/cm$^2$) is not fulfilled sooner or later. Therefore, the gas leak from the connector is detected and announced.

In the above described seat leak detection method shown in FIGS. 4 and 5, ultimate vacuum pressure check which is performed in step 70 may be performed again in step 72. The absolute pressure may be monitored continuously through steps 70, 72 and 76 while simultaneously monitoring the pressure fluctuation in step 76.

In the above described method for automatically detecting gas leak from the connector shown in FIGS. 6 and 7, monitoring the absolute pressure in the pipe 14 with the pressure gauge $P_2$ may start when the valve V4 opens, and the monitoring may be continued until step 130. In step 130, the pressure fluctuation may be monitored simultaneously.

According to thus structured method, the absolute pressure is monitored through several steps. Since the absolute pressure is monitored continuously, detection failure is reduced.

Figure 8:
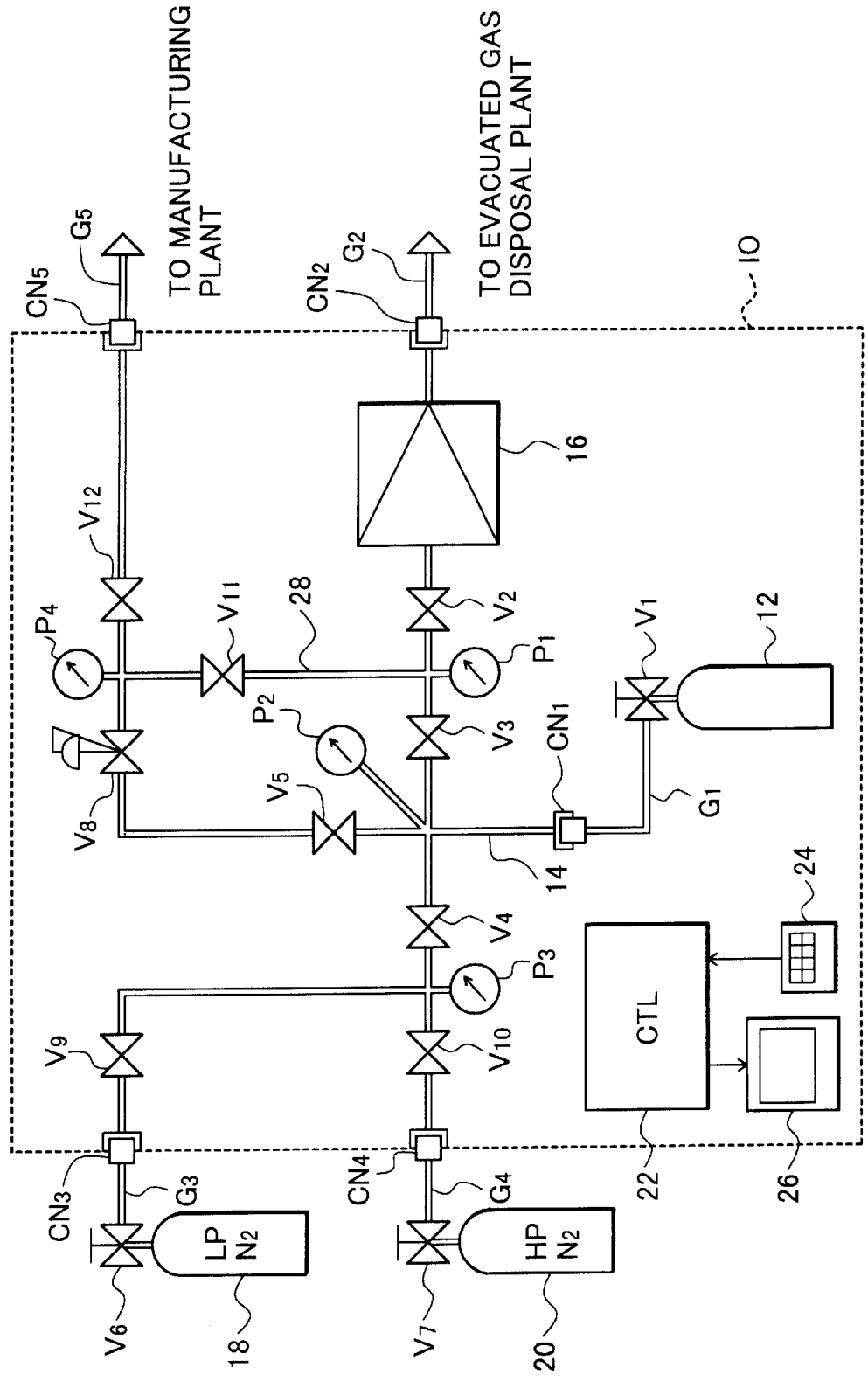
FIG. 8 is a piping diagram of the other gas plant which can employ the present invention.

The gas plant which can employ the present invention is not limited to that shown in FIG. 1. For example, a gas plant shown in FIG. 8 may employ the present invention. The gas plant shown in FIG. 8 will now be described. In FIG. 8, like or same reference numerals as used in FIG. 1 are also used in FIG. 8 to denote corresponding or identical components.

The gas plant shown in FIG. 8 has the following components which are not included in the gas plant shown in FIG. 1. (A) A valve $V_8$ between the connector $CN_3$ and the valve $V_4$, and a valve V10 between the connector $CN_4$ and the valve $V_4$. (B) A pipe 28 branched from a pipe between the valves $V_2$ and $V_3$, and connected via a valve $V_{11}$ to a pipe which is connected to an outlet of the valve $V_8$. (C) A pressure gauge $P_4$ and a valve $V_{12}$ provided on a pipe between the valve $V_8$ and the connector $CN_5$. Other components are the same as those of the gas plant shown in FIG. 1.

The present invention is described along the preferred embodiment, but should not be limited thereto. It will be obvious for those skilled in the art that various substitutions, alterations, modifications and the like are possible.

What are claimed are:

1. A method for automatically detecting gas leak from a target object provided on gas piping comprising the steps of:

issuing command for creating an airtight room, formed by closing at least two valves, and communicating with said target object;

issuing command for pressurizing said airtight room until a predetermined pressure is reached to define a start time for conducting a gas leakage test;

detecting a change of absolute pressure and a monitored range of pressure fluctuation of said airtight room over a specified time period, measured with a gauge; and discriminating whether gas leaks from said target object or not based on the detected said change of absolute pressure and said monitored range of pressure fluctuation.

2. The method for automatically detecting gas leak according to claim 1, wherein said target object is a valve provided on a gas-containing vessel, and said command for pressurizing comprises evacuating said airtight room and then pressurizing said airtight room.

3. The method for automatically detecting gas leak according to claim 2, wherein said discriminating step includes the step of discriminating whether the pressure of said airtight room is reduced or not.

4. The method for automatically detecting gas leak according to claim 1, wherein said target object is a connector detachably connecting a gas pipe from a valve on a gas-containing vessel, and said command for pressurizing comprises introducing high-pressured gas into said airtight room.

5. A method for automatically detecting gas leak from a target object provided on gas piping comprising the steps of:

issuing command for creating an airtight room formed by closing at least two valves, and communicating with said target object;

issuing command for pressurizing said airtight room until a predetermined pressure is reached to define a start time for conducting a gas leakage test;

detecting a change of absolute pressure and a monitored range of pressure fluctuation of said airtight room over a specified time period, measured with a gauge;

discriminating whether gas leaks from said target object or not based on the detected said change of absolute pressure and said monitored range of pressure fluctuation;

wherein said target object is a connector detachably connecting a gas pipe from a valve on a gas-containing vessel;

said command for pressurizing comprises introducing high-pressured gas into said airtight room;

wherein the pressure of the high-pressured gas is equal to or greater than 100 $kgf/cm^2$, and said discriminating step comprises a step of discriminating whether the pressure is equal to or greater than 100 $kgf/cm^2$ or not.

6. The method for automatically detecting gas leak according to claim 1, wherein said gas piping is connected to said airtight room and has a pressure gauge for detecting gauge pressure with respect to the atmospheric pressure.

7. The method for automatically detecting gas leak according to claim 1, wherein said steps are controlled by a CPU.

8. A method for automatically detecting gas leak from a target object provided on gas piping comprising the steps of:

issuing command for creating an airtight room, formed by closing at least two valves, and communicating with said target object;

issuing command for pressurizing said airtight room until a predetermined pressure is reached to define a start time for conducting a gas leakage test;

detecting a change of absolute pressure and a monitored range of pressure fluctuation of said airtight room over a specified time period, measured with a gauge; and discriminating whether gas leaks from said target object or not based on the detected said change of absolute pressure and said monitored range of pressure fluctuation;

wherein said target object is a valve provided on a gas-containing vessel, or a connector detachably connecting a gas pipe from said valve on the gas-containing vessel, said method has a front stage and a back stage, and each of said front back stages comprises said steps.

9. The method for automatically detecting gas leak according to claim 8, wherein said target object to be inspected during said front stage is a valve provided on a gas-containing vessel, and said command for pressurizing in said front stage includes evacuating said airtight room.

10. The method for automatically detecting gas leak according to claim 9, wherein said discriminating step in said front stage comprises a step of discriminating whether the pressure of said airtight room is reduced or not.

11. The method for automatically detecting gas leak according to claim 9, wherein said target object to be inspected in said back stage is a connector detachably connecting a gas pipe from said valve on the gas-containing vessel, and said command for pressurizing in said back stage includes introducing high-pressured gas into said airtight room.

12. The method for automatically detecting gas leak according to claim 11, wherein the pressure of said high-pressured gas is equal to or greater than 100 $kgf/cm^2$, and said discriminating step in said back stage includes a step of discriminating whether the pressure is equal to or greater than 100 $kgf/cm^2$ or not.

13. A method for automatically detecting gas leak from a valve provided on a gas-containing vessel comprising the steps of:

issuing command for creating an airtight room, formed by closing at least two valves, and communicating with said valve;

issuing command for evacuating said airtight room;

detecting a change of absolute pressure and a monitored range of pressure fluctuation measured with a pressure gauge provided in said airtight room over a specified time period while keeping said airtight room being hermetic after the evacuation is stopped; and discriminating whether gas leaks from said valve or not based on the detected said change of absolute pressure and said monitored range of pressure fluctuation.

14. A method for automatically detecting gas leak from a connector detachably connecting a gas pipe from a valve on a gas-containing vessel, comprising the steps of:

issuing command for creating an airtight room, formed by closing at least two valves, and communicating with said connector and with said valve via said gas pipe;

issuing command for evacuating said airtight room;

issuing command for introducing gas into said airtight room after evacuation is stopped;

detecting a change of absolute pressure and a monitored range of pressure fluctuation measured with a pressure gauge provided in said airtight room over a specified time period containing said gas while keeping said airtight room being hermetic; and discriminating whether gas leaks from said connector or not based on the detected said change of absolute pressure and said monitored range of pressure fluctuation.

15. An apparatus for automatically detecting gas leak from a target object provided on gas piping comprising:

means for creating an airtight room, formed by closing at least two valves, and communicating with said target object;

means for pressurizing said airtight room to a predetermined pressure;

means for detecting a change of absolute pressure and a monitored range of pressure fluctuation of said airtight room over a specified time period; and means for discriminating whether gas leaks from said target object or not based on the detected said change of absolute pressure and said monitored range of pressure fluctuation.

16. A computer readable recording medium storing a program which makes a computer execute steps of:

issuing command for creating an airtight room, formed by closing at least two valves, and communicating with said target object;

issuing command for pressurizing said airtight room until a predetermined pressure;

detecting a change of absolute pressure and a monitored range of pressure fluctuation of said airtight room over a specified time period, measured with a gauge; and discriminating whether gas leaks from said target object or not based on the detected said change of absolute pressure and said monitored range of pressure fluctuation.

* * * * *